United States Patent [19]

Mead

[11] 4,351,535
[45] Sep. 28, 1982

[54] VERSATILE FAST HITCH SIDE MOUNTING OF AGRICULTURAL SPRAY TANKS

[75] Inventor: Harold C. Mead, Charles City, Iowa

[73] Assignee: Nixdorff Krein Industries, Inc., St. Louis, Mo.

[21] Appl. No.: 220,111

[22] Filed: Dec. 24, 1980

[51] Int. Cl.[3] ............................................. B60P 3/030
[52] U.S. Cl. ................. 280/5 R; 224/42.44; 224/273; 280/760; 414/498
[58] Field of Search .............. 280/5 R, 5 H, 5 F, 5 G, 280/5 A–5 E, 7, 30–32, 32.7, 405 B, 406 R, 411 B, 412, 413, 61, 760, 727; 239/149, 172, 164; 111/1, 59, 64, 67; D15/13, 23; 410/68, 156; 414/498, 680, 462, 912; 224/42.03 A, 42.03 R, 42.07, 310, 314, 42.32, 42.33, 42.34, 42.35, 42.36, 42.41–42.45 R, 273, 42.4; 293/DIG. 1; 296/3, 35.1; 180/36, 39

[56] References Cited

U.S. PATENT DOCUMENTS

| | | |
|---|---|---|
| 2,232,825 | 2/1941 | May .................... 301/5 R X |
| 2,499,654 | 3/1950 | Kuhlman ............. 224/42.45 R |
| 2,560,570 | 7/1951 | Harig ........................... 296/3 |
| 2,563,372 | 8/1951 | Risse . |
| 2,680,624 | 6/1954 | Pool et al. . |
| 3,007,699 | 11/1961 | Taylor . |
| 3,455,475 | 7/1969 | Suteau . |
| 3,488,061 | 1/1970 | Hansen et al. . |
| 3,583,718 | 6/1971 | Meyer .................... 280/5 R |
| 3,650,501 | 3/1972 | Streb ..................... 280/5 R |
| 3,815,830 | 6/1974 | Rowan ................. 239/172 X |
| 3,857,576 | 3/1974 | Wilt ...................... 280/5 H |
| 3,883,020 | 5/1975 | Dehn .................... 414/498 |
| 3,900,201 | 8/1975 | Johnson et al. ......... 280/5 H |
| 4,114,770 | 9/1978 | Jordan et al. .......... 414/680 |
| 4,149,734 | 4/1979 | Sylvester . |
| 4,162,796 | 7/1979 | Mead .................... 280/5 R |

FOREIGN PATENT DOCUMENTS

1087667 2/1955 France ...................... 239/172

Primary Examiner—Joseph F. Peters, Jr.
Assistant Examiner—M. J. Hill
Attorney, Agent, or Firm—Kalish & Gilster

[57] ABSTRACT

Apparatus for providing fast hitch tractor side mounting of agricultural spray tanks including a carry-through frame adapted for relatively permanent securement to the tractor therebeneath by securement to the tractor frame and for supporting the weight of the tanks. Each tank is carried upon a tank-carrying frame. The latter and carry-through frame are configured for fast hitch two-point interengagement providing securement of the tank-carrying frames at opposite sides of the tractor to corresponding sides of the carry-through frame. Each tank-carrying frame is preferably also equipped with landing gear including retractable legs carrying dolly wheels, as well as a jack leg, for stably supporting the tank when not attached to the tractor and facilitating rolling of the tank up to the tractor for fast hitching of the tank-carrying frame to one end of the tractor mounted carry-through frame. The tank-carrying frame members can be selectively oriented for various desired positions of the tanks. An arrangement also is disclosed for alternatively connecting the tank-carrying frame, bearing a tank, to a three-point hitch at the rear of the tractor.

13 Claims, 12 Drawing Figures

VERSATILE FAST HITCH SIDE MOUNTING OF AGRICULTURAL SPRAY TANKS

BACKGROUND AND SUMMARY OF THE INVENTION

This invention relates to agricultural sprayers and spray tanks and, more particularly, to an apparatus for providing so-called fast hitch tractor side mounting of spray tanks.

Heretofore, it has been known to secure spray tanks, as used for agricultural spraying, to the opposite sides of a tractor, in contradistinction to trailer-mounted or rear-hitch mounting of spray tanks. This allows the tractor to carry the weight of the spray tank centrally while permitting it to pull other implements such as disc-harrows, plows, etc.

Previous spray tank side-mounting arrangements have made use of large transverse support beams which extend under the tractor and are secured to the frame of the tractor. Spray tanks upon tank-carrying saddles are then secured to the beams. All of this requires difficult manhandling and wrestling with various heavy pieces which must be first lifted into position and then secured for installation. Upon removal, one is again confronted with the need of difficult, burdensome, and awkward handling of various pieces.

In one prior art arrangement, it has been possible to leave a spray tank mounted to one end of such beam or beams, leaving the opposite ends free to permit sliding through bracket members, a spray tank must then be secured to the opposite beam end. For removal, one spray tank must be removed before the beam or beams. Hence, installation and removal are awkward and time consuming.

Not necessarily typical of the prior art arrangements for side mounting of spray tanks on tractors but, nevertheless, representative of the difficulties attendant such prior art are the apparatus disclosed in U.S. Pat. Nos. 3,488,061 (Hansen et al); 3,900,201 (Johnson et al); and 4,149,734 (Sylvester et al). Of these, Hansen et al is well representative of an arrangement requiring awkward handling of individual spray tank mounting and support members.

Accordingly, it is an object of the invention to provide an apparatus for fast hitch tractor side mounting of agricultural spray tanks or the like.

A further object of the present invention is to provide such apparatus which allows spray tanks to be rapidly and quickly secured to and subsequently removed from the opposite sides of a tractor.

It is a still further object of the present invention to provide such apparatus for obviating the manhandling and wrestling of heavy spray tanks and various awkward, heavy frame components.

A related object of the invention is to provide such apparatus permitting spray tanks to be selectively attached to and removed from a carry-through structure which is intended for relatively permanent securement to a tractor to the frame beneath said tractor.

Another object of the invention is to provide such apparatus including spray tanks and tank-carrying frames, which can be quickly connected to the carry-through structure, to be easily and quickly rolled into position at the opposite sides of the tractor.

A further object of the invention is the provision of such apparatus wherein the spray tanks and tank-carrying frames may remain secured together at all times and can be stored separate from the tractor in readiness for rapid attachment to the tractor.

Yet another object of the invention is the provision of such apparatus wherein the tank-carrying frame can be optimally positioned relative to structure of the tractor for providing clearance, convenient orientation, and/or for preventing interference with access to, or operation of, tractor components.

Still another object of the invention is the provision of such apparatus which allows a single tank to be carried by the tractor on one side thereof.

Another object of the invention is the provision of such apparatus which securely and safely mounts spray tanks on opposite sides of the tractor and permits carrying same under rough field conditions without permitting the tank to shift relative to the tank-carrying frame.

Another object of the invention is the provision of such apparatus which provides a tank-carrying frame which can be carried by a three-point hitch to the rear of the tractor, rather than at the side.

Among still other objects of the invention are the provision of apparatus of the character stated which not only is strong, tough, and reliable but also highly effective in use, yet is economically manufacturable.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
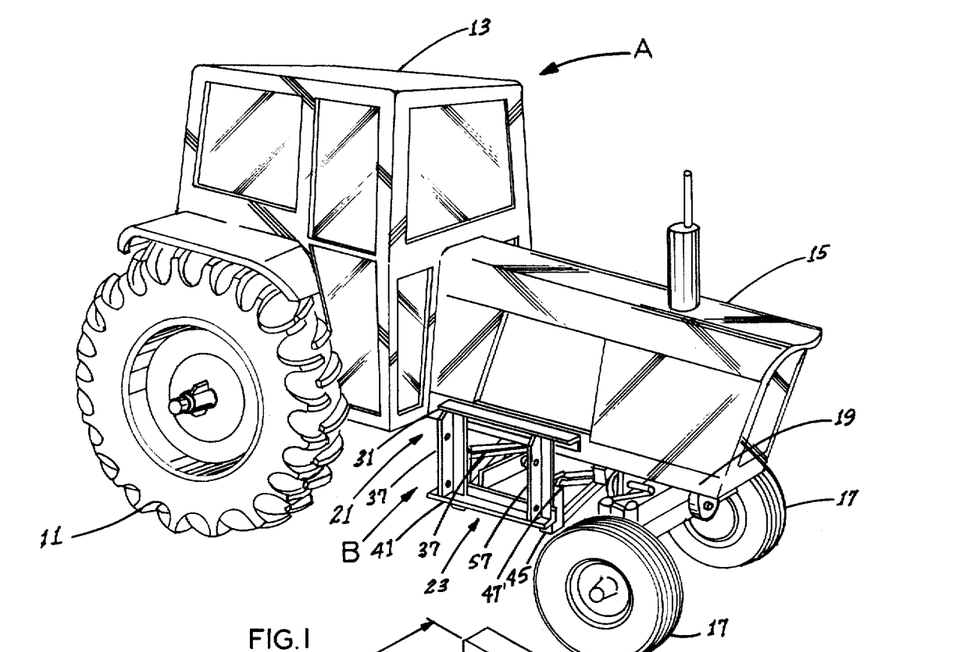
FIG. 1 is a perspective view of an agricultural tractor to which a carry-through frame is secured, said frame forming part of apparatus constructed in accordance with and embodying the present invention.
Figure 3:
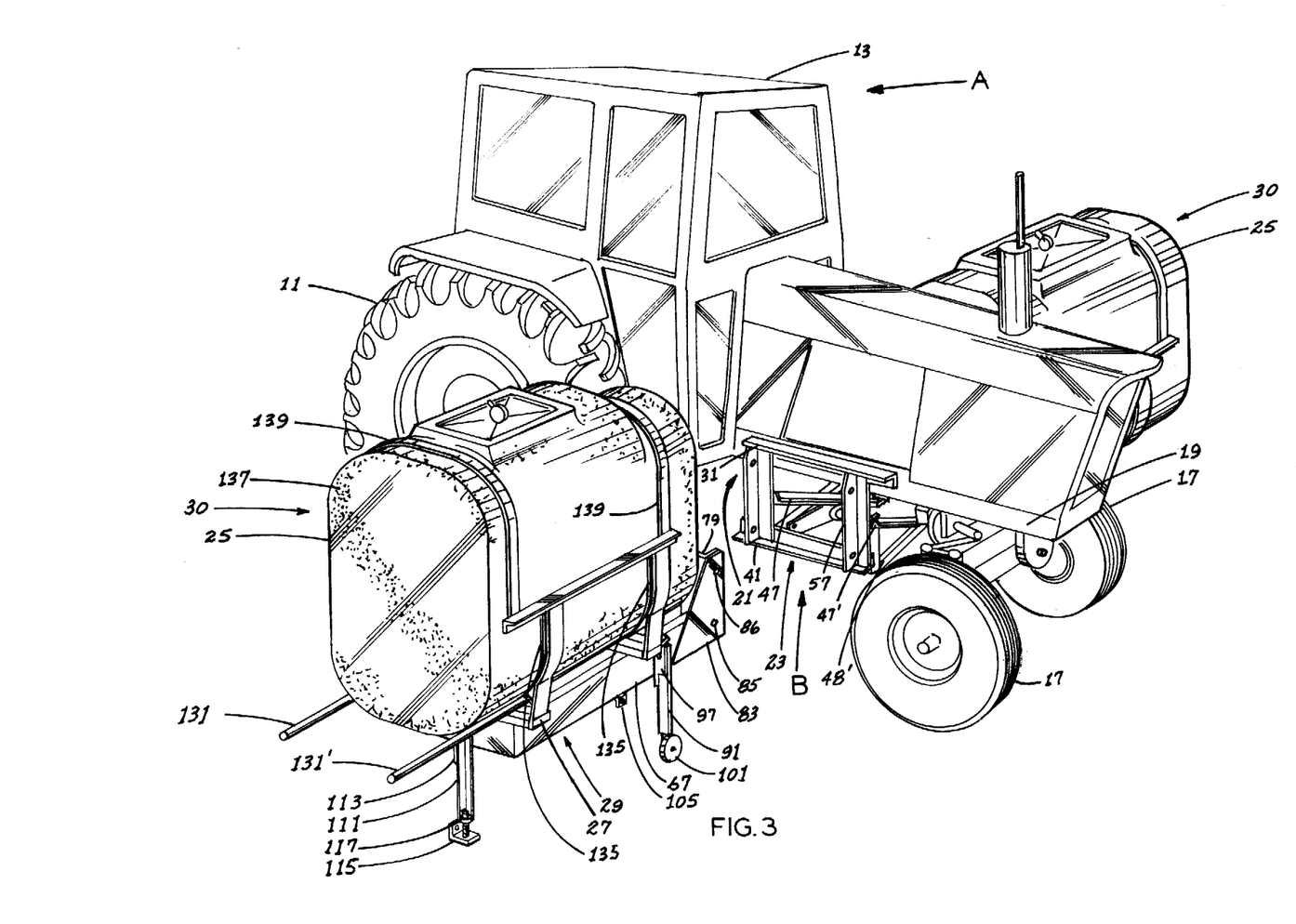
FIG. 3 is a perspective view illustrating the placement of spray tanks and tank-carrying frames, to which said tanks are secured, adjacent the sides of the tractor in readiness for fast hitching of the tank-carrying frames to the carry-through frame.

Referring now by reference characters to the drawings, and particularly FIGS. 1 and 3, illustrated generally at reference character A is an agricultural tractor for which a versatile apparatus B of the invention is utilized for side-mounting of spray tanks on opposite sides of the tractor.

Tractor A is of the type having drive wheels 11 and an operator cab 13 centered between the drive wheels and with the engine compartment 15 extending forwardly therefrom, the conventional front wheels 17 being located under the front of the tractor beneath said engine compartment. Typically, such a tractor includes a frame including opposite side frame members such as that designated at 19. There is, thus, located beneath the tractor engine compartment a space 21.

In accordance with the invention, connected to the tractor frame members such as that shown at 19, apparatus B includes a carry-through frame generally designated 23 for side-mounting of each of two spray (i.e., so called solution) tanks 25. Each spray tank 25 is seated upon a saddle 27 which is in turn carried upon a tank-carrying frame generally designated 29, thereby providing tank units 30.

Apparatus B is intended to provide fast hitch two-point securement of tank-carrying frame 29 to frame 23, thus hitching or securing of units 30 at the opposite sides of the tractor A, at the sides of engine compartment 15. Accordingly, units 30 are rapidly mounted upon tractor A, and similarly may be rapidly removed from the tractor.

Figure 2:
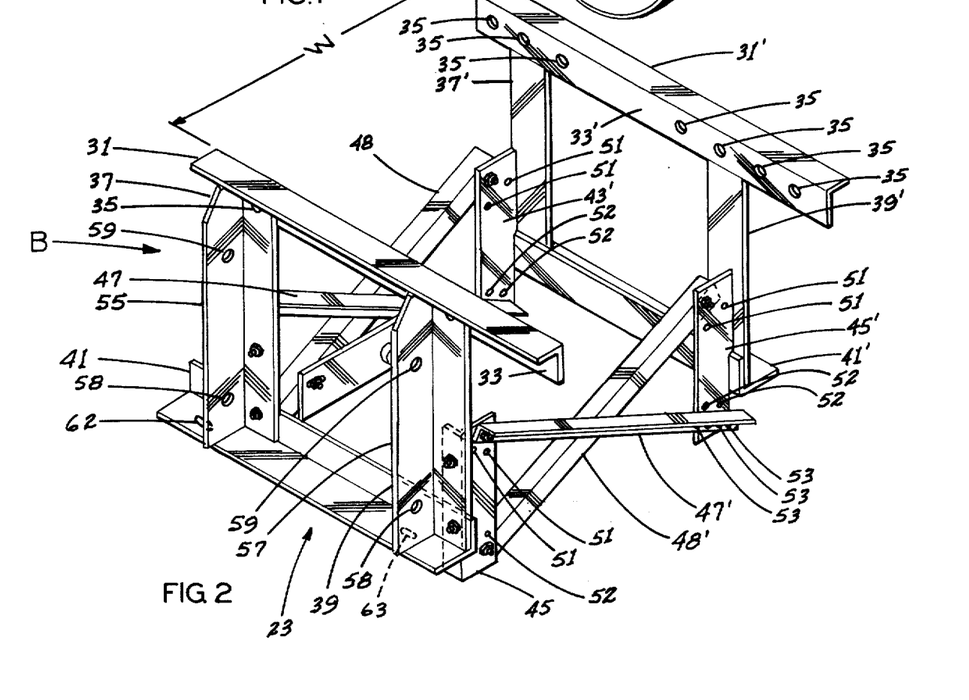
FIG. 2 is a perspective view of the carry-through frame revealing its truss character and specific components.

Referring now to FIG. 2, carry-through frame 23 is revealed to be of a truss configuration comprising L-section frame members 31, 31' each configured for providing a vertical face 33, 33' for lying against the outer surface of the tractor frame members, such as that shown at 19. Each of frame members 31, 31' is provided with a plurality of apertures, i.e., bolt holes 35 spaced at intervals therealong whereby the frame member can be aligned with holes of the tractor frame which either are already conventionally present or readily can be provided.

In accordance with the invention, the distance W between the inner faces 33, 33' may be varied, as described below, to allow for different tractor frame widths. Frame members 31, 31' are, thus, intended to be bolted to the tractor frame members for relatively permanent securement of carry-through frame 23 of apparatus B beneath tractor A.

Carry-through frame 23 comprises at opposite sides a pair of upright or essentially vertical frame members, as at 37, 37', and 39, 39', each of L-section. The lower extremities of these vertical frame members are joined at opposite ends by L-section horizontal frame members 41, 41'. Preferably, but not necessarily, the various frame members 31, 31', upright members 37, 37' and 39, 39', and lower frame components 41, 41' are bolted to one another. The various frame members may, instead, be welded to one another.

Extending along the rear face of each of upright members 37, 37' and 39, 39' and welded or more preferably bolted thereto are shorter vertical members 43, 43' and 45, 45'. These provide points of attachment for pairs of cross braces 47, 47' and 48, 48' which are bolted to said shorter upright members, as shown in FIG. 2, by bolt holes 51 at the upper ends and holes 52 at the lower ends. Further, the L-section cross braces 47', 48' each have several bolt holes, as designated at 53, proximate their ends whereby there are made available a number of different combinations of apertures which can be lined up within the vertical members 45, 45' and 43, 43' to allow considerable variation in the spacing W between the inner faces of the securement frame members 31, 31', dependent upon the tractor frame width.

Upright members 37, 37' and 39, 39' provide outwardly directed flanges, as designated at 55, 57. These in turn are provided with bolt holes 58 and 59 proximate the bottom and upper ends, respectively, for securement to corresponding flanges of upright members of tank-carrying frame 29. Also depicted in FIG. 2 is the provision, in the outwardly directed flange of horizontal member 41, of elongated apertures 62, 63. These, as explained in the following description, facilitate interengagement of tank-carrying frame 29 with carry-through frame 23.

Figures 4, 5A, 5B, 6:
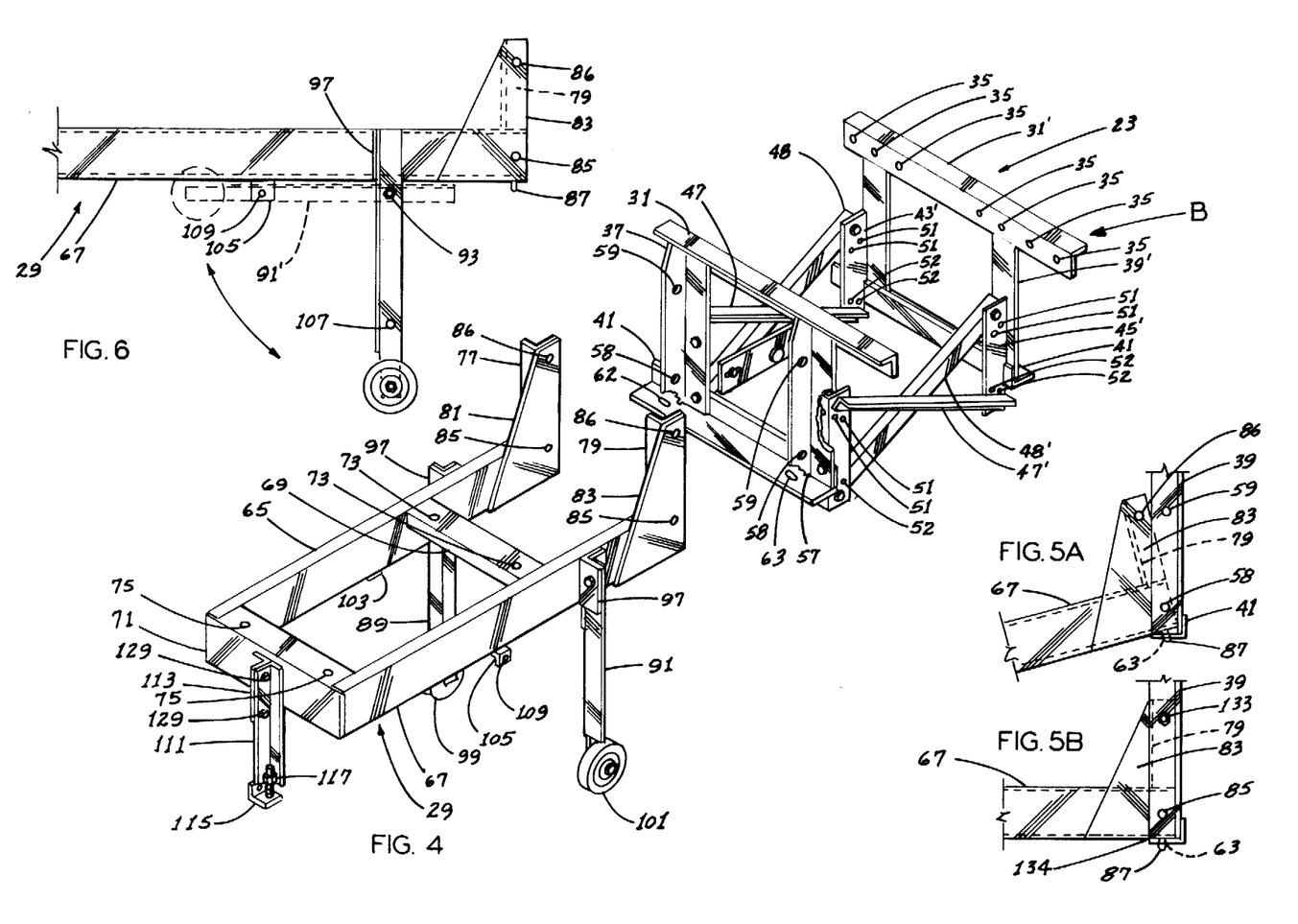
FIG. 4 is a perspective view of a tank-carrying frame in proximity to the carry-through frame for illustrating relative orientation of the respective components of said frames prior to being secured together.
FIG. 5A constitutes a partial side elevation of attachment portions of the tank-carrying frame and carry-through frame and illustrating a first orientation of such portions during hitching.
FIG. 5B is a similar elevation of the same portions indicating their relative position upon completion of hitching.
FIG. 6 is a side elevation of portions of the tank-carrying frame and showing the provision of a landing gear arrangement of such frame including retractable dolly wheels.

Referring now to FIG. 4, the features of tank-carrying frame 29, but without saddle 27 and tank 25 thereon, will be more clearly apparent. Said frame 29 comprises a spaced pair of side frame members 65, 67 maintained in spaced relationship by transverse frame members or braces 69, 71 each having bolt holes, as at 73, 75, for bolting of saddle 27 thereto, as is conventional and understood by those skilled in the art.

Extending upward from one end of each side frame member 65, 67 are upright members 77, 79 which are rigidly secured to horizontal frame members 65, 67. Additionally, gusset plates 81, 83 are provided, interengaging the respective upright members and horizontal frame members and strongly welded thereto. Spacing between said gusset paltes 81, 83 and betweeen the upright members 77, 79 is chosen to correspond with the spacing between the outwardly directed flange of the upright members 37, 39 of carry-through frame 23, whereby when placed in juxtaposition, there will be alignment of the respective frame members. Further, said upright members 77, 79 and gusset plates 81, 83 are provided with holes 85, 86 at the top and bottom thereof which are adapted to align with those holes 58, 59 of the upright members of the carry-through frame.

Referring to FIG. 6, there will also be observed the presence of a downwardly extending projection or stud 87 at the outer end of side frame member 67 and such stud 87 may be carried at the lower end of frame member 79. There is a similar stud (not shown) at the outer end of side frame member 65. The studs are adapted to align with and can be inserted into apertures 63 of the lower frame member 41 of carry-through frame 23 in the manner demonstrated in FIGS. 5A and 5B, for purposes shortly to be apparent.

In accordance with the invention, each tank-carrying frame 29 is provided with a pair of landing gear legs 89, 91 pivotally secured to frame 29 for movement between an extended ground supporting position, as shown, and a retracted position, as shown at 91' in FIG. 6. For this purpose, legs 89, 91 are bolted, as at 93, to a short L-section bracket member 97 which extends slightly below the lower edge of the respective side frame member, such as that at 67. Carried at the lower end of each of said legs 89, 91 is a respective dolly wheel 99, 101 whereby, upon the legs 89, 91 being in the extended position shown in FIG. 4, the tank-carrying frame 23 with its saddle 27 and tank 25 mounted thereon is supported at a convenient height for immediate interengagement with carry-through frame 23. Legs 89, 91 are secured proximate the end of the frame to be thus interengaged with carry-through frame 23 but spaced somewhat rearwardly from the upright members 77, 79 and yet forward of the center of gravity of unit 30, i.e., tank-carrying frame 29 with its saddle and tank mounted thereon.

For securement of the respective landing gear legs 89, 91 when retracted, there is provided along the lower edges of each side frame members respective brackets 103, 105 permitting the landing gear legs to be bolted thereto, as by means of bolts through holes as that shown at 107 shown in FIG. 6. Brackets 103, 105 similarly each have a bolt hole, as at 109 (FIG. 6), for this purpose.

At the opposite end of the tank-carrying frame 23 is located a jack stand consisting of a length 111 of L-section material bolted by a flange fitting or bracket 113 to the vertical face of transverse frame member 71. At the lower end of said jack leg 111 is an adjustable foot 115 which may be raised or lowered by adjustment of a screw and nut combination 117 for raising or lowering the end of the tank-carrying frame and thereby correspondingly lowering or raising the other end, which is to be interengaged with the carry-through frame 23.

Figures 10, 11:
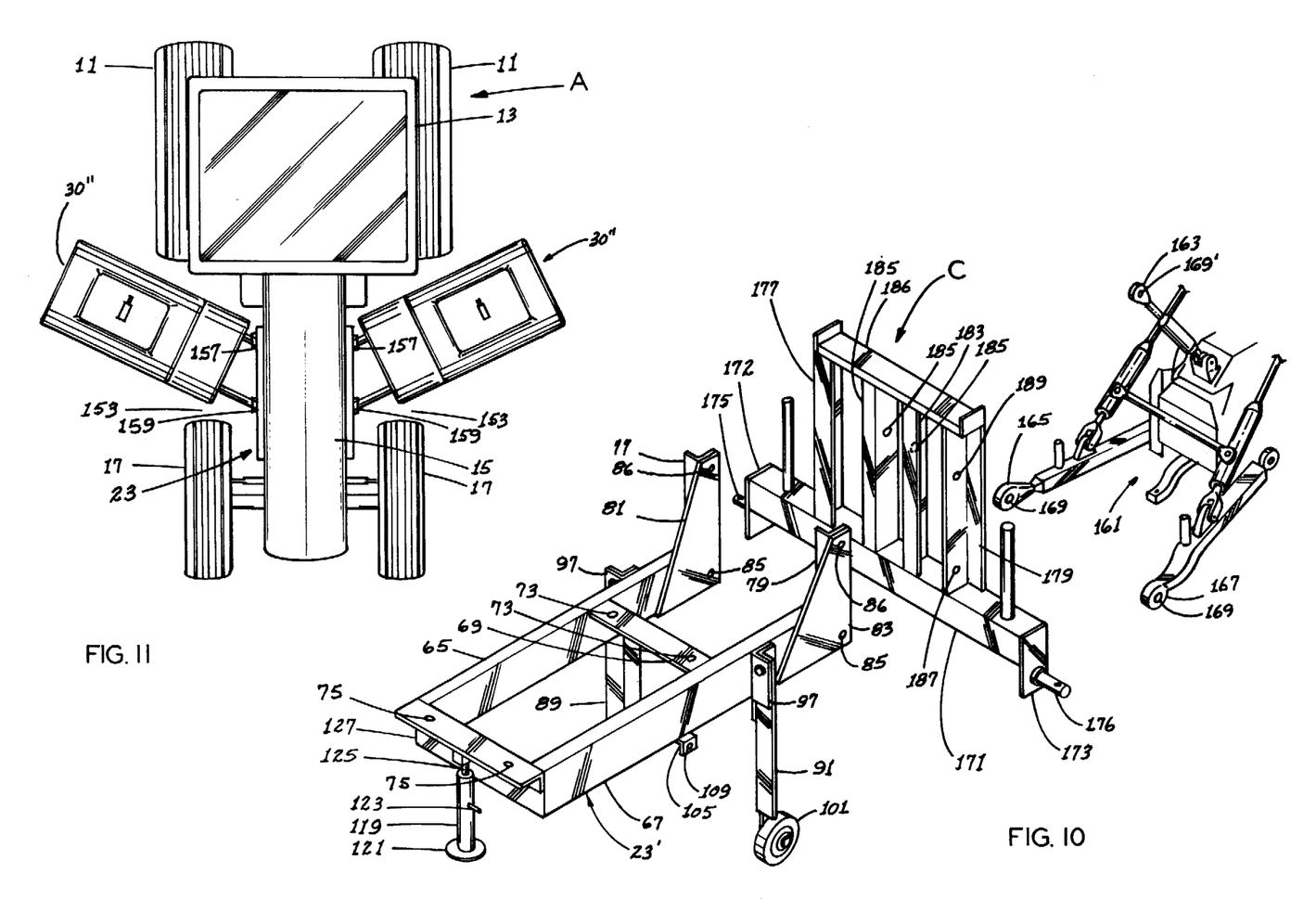
FIG. 10 is an exploded perspective view of a tank-carrying frame of the invention and a hitch adaptor frame for use with the tank-carrying frame to permit mounting same at the rear of the tractor, said hitch attachment frame being located proximate members of a so-called three-point rear hitch of the tractor.
FIG. 11 is a simplified top plan view of a tractor and spray tanks secured thereto in accordance with the invention illustrating one of various possible orientations of the tanks made possible by the invention.

Such jack leg arrangement is but one of numerous possible jack stand arrangements, another being illustrated in FIG. 10 wherein it will be observed that a jack stand consists of a cylindrical jack member 119 having a circular foot 121 and a handle 123 for turning of the cylinder 119 with respect to a jack screw 125 secured to an L-section bracket member 127 performing the same function as member 71 of frame 23. In FIG. 10, the modified frame carrying this form of jack stand 119 is designated at 23' and, except for the modification at the end to which said jack stand 119 is attached, is otherwise substantially identical with tank-carrying frame 23.

In either event, whether by means of bolts 119 (FIG. 4) or by simply unscrewing the cylindrical jack stand member 119 (FIG. 10), the jack leg or jack stand may be selectively removed from the respective tank-carrying frame 23, 23' once the frame has been secured to carry-through frame 23. The jack leg 111 or post 119, readily allows the respective jack leg foot 115, 121 to be raised or lowered for convenient adjustment in the height of the upright members 77, 79 and corresponding gusset plates 81, 83 to permit precise adjustment of the elevation of the securement apertures 85, 86 so that they can be aligned with corresponding apertures 58, 59 of carry-through frame 23.

For further facilitating manuevering of tank unit 30, as depicted, for example, in FIG. 3, and for allowing same to be rolled adjacent tractor A for securement to carry-through frame 23, there are provided a pair of wheelbarrow-like handles 131, 131' which extend rearwardly from saddle 27 along the lower edge of tank 25.

Movement of tank unit 30 is as easy as using a wheelbarrow. This ease of movement contrasts sharply with the awkwardness of handling prior art side-mount tank apparatus, and allows one man to do what previously required the assistance of others.

Referring now to FIGS. 5A and 5B, securement of tank-carrying frame 29 at its two sides to carry-through frame 23 is illustrated. The user grasping handles 131, 131' for example, as shown in FIG. 3, wheels tank unit 30 until it is positioned with upright frame members 77, 79 and corresponding gussets 81, 83 adjacent the corresponding upright frame members 37, 39 of the carry-through frame. Adjustment of jack stand foot 115 is then provided until the studs, as at 87, will clear the outwardly extending flange of lower frame member 41 of carry-through frame 23. Tipping of tank-carrying frame 29 thus occurs on the axis of dolly wheels 99, 101. Handles 129, 131 are manipulated until each stud 87 fits within its corresponding aperture 63 of the carry-through frame, thus pivotally interengaging frames 23 and 29 whereby frame 29 is now presented for pivoting with respect to frame 23 about a transverse pivot axis extending through a point 134 (FIG. 5B) of contact of frames 23 and 29 near such studs. The studs (e.g., 87) thus serve as means for first maintaining frames 23, 29 in pivotal interengagement.

Subsequently, the opposite end, i.e., that carrying jack leg 111, is then tilted or pivoted upward about such pivot axis (which is, according to the embodiments preferred, parallel to the longitudinal axis or centerline of tractor A) until the bolt holes 86 align with those 59 of the carry-through frame. Suitable bolts (or pins, etc.) are then secured therein so that frame 23 is now secured to frame 29 so as to receive and support the total weight of each tank unit 30. For additional security, bolts or pins may be placed through holes 85 which align with those 58 of the carry-through frame. The resultant secured relationship of the carry-through frame 23 and tank-carrying frame 29 is depicted in FIG. 5B wherein a bolt 133 is shown.

After interengagement of the frames is thus carried out, legs 89, 91 are then raised to the position shown in FIG. 6 and there maintained in a retracted position while respective tank unit 30 remains secured to tractor A.

As will be appreciated from the foregoing, carry-through frame 23 provides a configuration for supporting the full weight of the tank units 30, 30' and transferring such weight to the tractor frame. In this regard, tanks 25 each contain several hundred gallons of liquid and, since each gallon very approximately weighs about 10 pounds several hundred gallons provide weight on each side of the tractor of several thousand pounds.

But, there are some uses of spray tanks of the present character not requiring them to be fully filled. When partially filled, the proportionately lesser weight may be safely borne on one side of the tractor. Apparatus of the invention permits a single tank unit 30 to be carried by the tractor without a corresponding unit on the opposite side, as suggested by FIG. 7. Prior art spray tank arrangements have not permitted the practical carrying of a single spray tank on only one side of the tractor.

Another significant feature of the invention involves mounting of each tank 25 to avoid its movement or shifting relative to saddle 27, which may otherwise result from the violent forces and accelerations to which the tank may be subjected by sloshing of thousands of pounds of fluid contained therein. This has been a problem with conventional saddle-mounted tanks when a tractor carrying the tanks is exposed to severe jolting, vibration, and jerking.

To avoid such undesirable shifting, tank unit 30 includes rubber pads or linings, as at 135 (FIG. 3), along the tank-confronting exterior surfaces of the tank saddle 27. Further, the exterior surface of the tank is provided with a rough, sandpaper-like finished surface 137 which may be provided by sprinkling of sand on the material of the tank during manufacture, e.g., as in applying a surface coating to a fiberglass tank or painting a metal tank. This roughened surface provides small protrusions which seat into the rubber layer 135 to relatively rigidly lock the tank in saddle 27. Saddle 27 also includes straps, as at 139, for clampingly seating the tank within the saddle.

Figure 7:
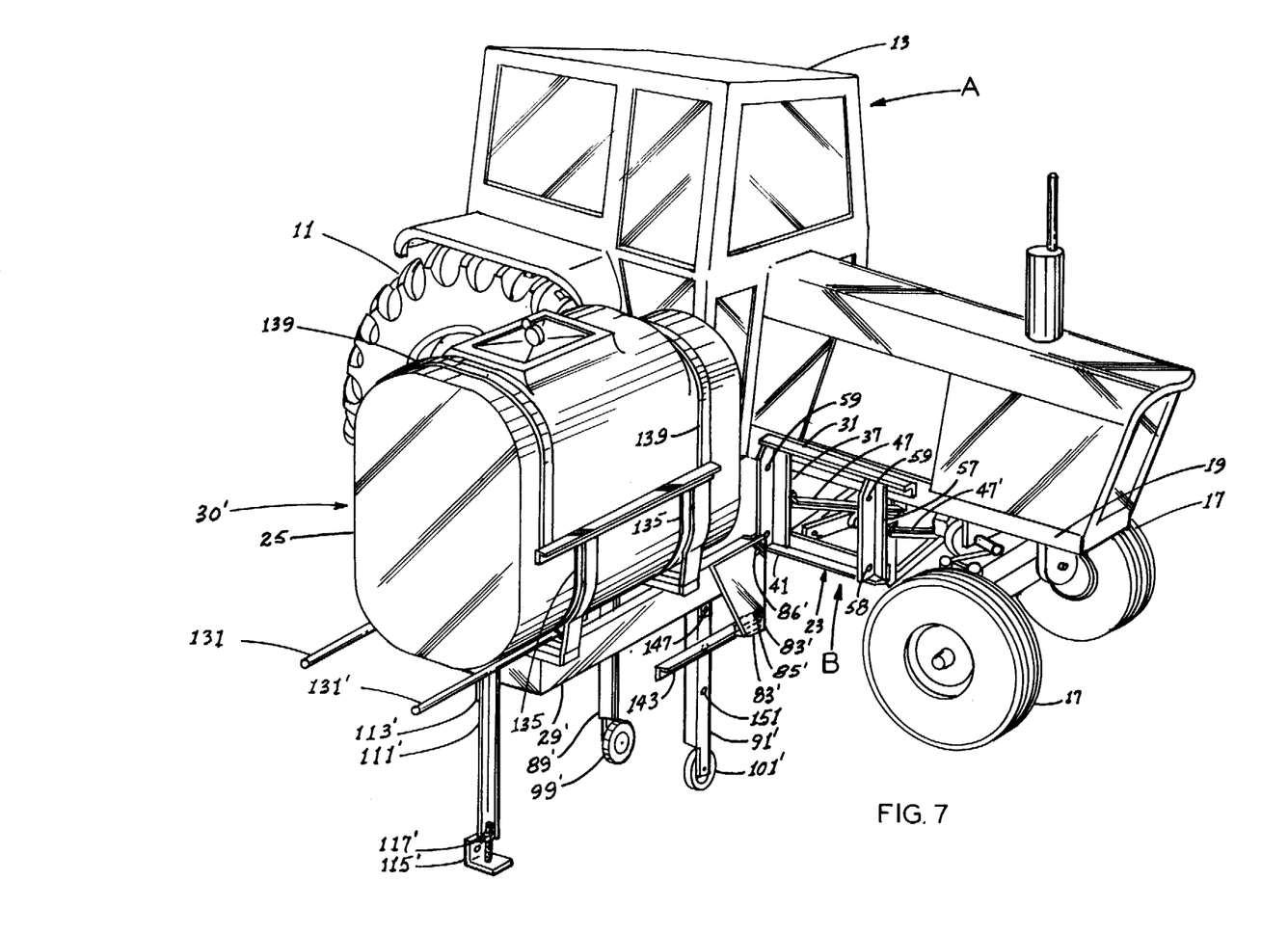
FIG. 7 is a perspective view of a tractor and a spray tank upon its tank-carrying frame, located adjacent the side of the tractor in readiness for fast hitching to the tractor, and with components of the tank-carrying frame oriented for carrying of the tank elevated relative to the position shown in FIG. 3.

A tank-mounting frame of the invention also makes possible various different positions of mounting of the tanks other than as shown in FIG. 3. Referring to FIG. 7, a tank unit 30' is provided with a tank-carrying frame 29' wherein the frame is provided with its gusset, such as that shown at 83', and other mounting components similarly downwardly oriented, in contrast with frame 29, so that when frame 29' is interengaged with carry-through frame 23, tank 25 will occupy a position several inches higher relative to tractor A than in FIG. 3.

Figures 8, 9:
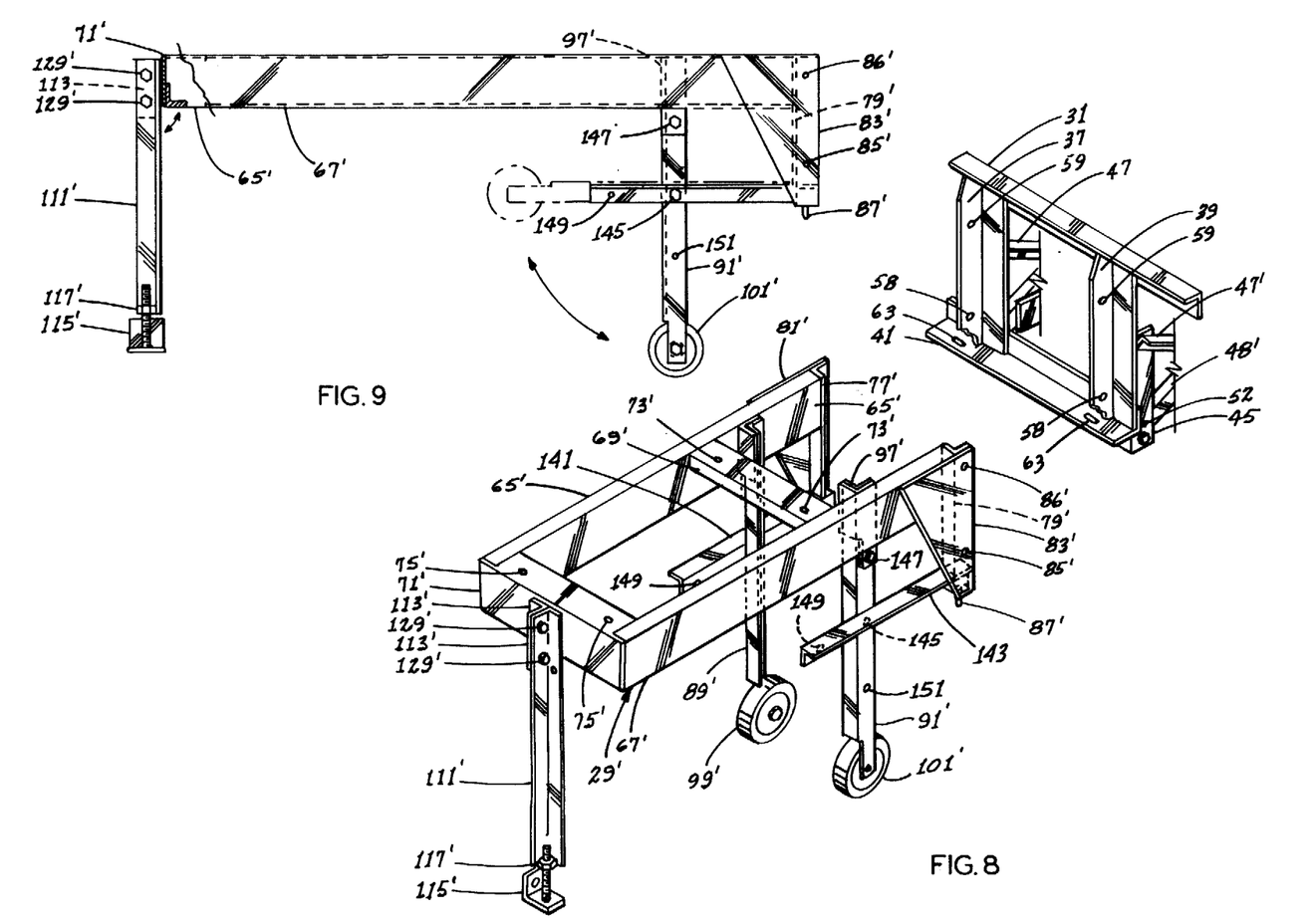
FIG. 8 is a perspective view of the tank-carrying frame, oriented as in FIG. 7, and positioned proximate the end portion of the tractor-mounted carry-through frame.
FIG. 9 is a side elevation, similar to FIG. 6, illustrating the provision of a landing gear dolly wheel arrangement for the tank-carrying frame of FIGS. 7 and 8.

Referring to FIG. 8, the features of frame 29' are shown with said frame being located proximate the corresponding end of carry-through frame 23. With reference to FIG. 8, frame 29' includes side frame members 65', 67' which are maintained in spaced relationship by transverse frame members or braces 69', 71' each having bolt holes, as at 73', 75', for mounting of the previously described tank saddle thereon.

Extending downward from the securement end of frame members 65', 67', are upright frame members 77', 79', each of L-section, and which are secured to gusset plates 81', 83'. Bolt holes, as at 85', 86', are provided for alignment with the existing holes 58, 59 of carry-through frame 23.

As is apparent in both FIGS. 8 and 9, there is provided at the lower end of each of the upright members 77', 79', a downwardly projecting stud 87' for fitting within the apertures 63 of frame member 41 of the carry-through frame, and functioning in the same manner as the studs 87 carried by frame 29', as shown in FIG. 6, to provide means for initial pivotal interengagement with carry-through frame 23, the upright or vertical members 77', 79' and bolt holes 85', 86' providing means for subsequent rigid securement of frame 29' to the carry-through frame, all thus serving to provide fast two-point hitching at each side.

There similarly are provided retractable legs 89', 91' which have dolly wheels 99', 101' at their lower ends. These are pivotally attached by bracket members 141, 143 which extend rearwardly from the lower end of upright frame members 77', 79', respectively. The legs are bolted to these members, as shown at 145 in FIG. 9, for permitting movement between extended and retracted positions, as appears.

It also is apparent that, when in the extended position, each of said legs is bolted to its corresponding side frame member 65', 67', as shown at 147 in FIG. 9. For providing reliable retension of the respective leg in its retracted position, said brackets 141, 143 are each elongated and provided at their attachment remote ends with bolt holes, as designated at 149 (FIG. 9) so that the respective leg can be bolted thereto, as a means of a bolt hole 151.

At the opposite end of the tank-carrying frame 29' there is provided a jack leg 111' having an adjustable foot 115' which can be raised or lowered by an adjustment of a screw and nut arrangement 117' and with said leg 111' being secured to the attachment remote end of frame 29' by being bolted to a bracket 113'.

As in the previous embodiment, said jack leg 111' is thus readily removable upon the tank-carrying frame 29' having been interengaged with the carry-through frame 23 at its opposite end.

Preferably, as shown in FIG. 7, the tank unit 30' thus realized is provided with two wheelbarrow-like handles 131, 131', for handling as in the previous embodiment.

Unit 30' can be secured to only one side of the tractor or, more typically, pairs of such units will be secured to the tractor at opposite sides thereof.

Various other mounting arrangements are readily facilitated by a tank-mounting arrangement of the new invention. Referring to FIG. 11, a tractor A is shown in top plan view with modified tank units 30" on opposite sides of motor compartment 15. But said units 30" are each angled rearwardly with respect to the longitudinal axis of the tractor for providing increased clearance, as at 153, on opposite sides of the tractor just rearwardly of the front wheels 17.

This is made possible by providing side frame members, such as those designated at 65, 67 in FIG. 4, which are of unequal lengths but with corresponding reorientation angularly of the upright members, e.g., 77, 79, so as to provide appropriate alignment with the corresponding upright members 37, 39 of carry-through frame 23. Hence, there are provided, as in previous embodiments, two points of attachment, as at 157, 159, at the opposite sides of the tractor to the corresponding portions of carry-through frame 23. Each upright frame member of the respective tank-carrying frame has, for attachment purposes, means for providing upper and lower points of attachment, all as previously described. Such an angled orientation as is thus manifested in FIG. 11, is made possible by the invention and was not heretofore achievable utilizing conventional unitary support beam arrangements for side mounting of spray tanks and the like.

Referring now to FIG. 10, an arrangement is demonstrated for connecting a tank unit, such as that shown at 30 or 30', to the rear of a tractor by use of a conventional three-point hitch having three points of securement 163, 165 and 167 as is conventional. Although hitch 161 is illustrated, for simplicity, as being of a conventional type having holes 169 on each of its hitch points each for engaging a pin, said hitch 161 can also be of the more modern so-called "quick-hitch" type having remotely operated jaws at the end of the hitch arms for permitting an operator to provide interengagement of the hitch and a farm implement by remote control while seated upon the tractor.

Demonstrated in FIG. 10 is the provision of a fixture C which is utilized for providing interengagement with hitch 161. Said fixture C comprises a horizontal frame member 171 having at its opposite ends plates 172, 173 carrying respective outwardly oriented pins 175, 176 for being received within said holes 169 of the hitch points, 165, 167, respectively. Extending upwardly from member 171 are a plurality of upright frame members 177, 179 at opposite sides and as well as centrally located upright frame members 181, 183. The latter two are provided with holes, as at 185, for receiving therein a pin (not shown) which will extend through holes 185 as well as hole 169' of upper hitch member 163. The vertical frame members identified are in turn secured to an upper frame member 186.

Provided in the flanges of the L-section side frame members 177, 179 are securement holes 187, 189 which align with corresponding holes 85, 86 of the tank-carrying frame 23'. The spacing between members 177, 179 corresponds to the spacing between gusset plates 81, 83 and upright members 77, 79 so that frame 23' can be bolted directly to said fixture C. The latter is then in turn interengaged with hitch members 163, 165 and 167 so that tank-carrying frame 23' will be raised or lowered by hitch 161. The retractable landing gear legs, as at 89, 91, provide the capability of rolling frame 23', with fixture C secured thereto, to a point of proximity to hitch 161 for being readily picked up by hitch 161.

Thus, it will be apparent that fixture C is, in effect, an adaptor for adapting the tank-carrying frame 23' for being picked up by said hitch 161. Of course, said frame 23' preferably carries a saddle-mounting tank. But, frame 23' can be used for supporting other agriculturally useful apparatus, such as pumps, special equipment, and so forth. But, advantageously, frame 23' is utilizable at the rear of the tractor for hitch securement without modification, and retains its configuration and character permitting it to be utilized alternatively for securement at the opposite sides of the tractor.

Although the foregoing includes a description of the best mode contemplated for carrying out the invention, various modifications are contemplated. For example, the studs, such as at 87 in FIG. 6, used for pivotal preengagement of the tank-mounting frame with the carry-through frame, may be presented on the upper, rather than lower ends of the vertical frame members, permitting the tank-mounting frame initially to be held in place after stud engagement by its own weight and thereafter secured by bolting at the lower ends of the vertical frame members.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. An apparatus for fast hitch tractor-side mounting of spray tanks or the like at opposite sides of an agricultural tractor, said apparatus comprising a carry-through and frame of truss configuration including means for securement of said carry-through frame beneath said tractor to frame members thereof, said carry-through frame being configured for supporting the weight of filled tanks on opposite sides of said tractor and transferring the weight of said tanks to said tractor frame members, said carry-through frame providing opposite ends proximate said tractor frame members, said opposite ends each including a pair of horizontally spaced apart upright frame members for providing points of securement for corresponding tank-carrying frames on opposite sides of said tractor, said points of securement being immediately proximate corresponding ones of said tractor frame members, each said tank-carrying frame being adapted for carrying at least one of said tanks and including a pair of spaced horizontal side frame members and at least one upright frame member carried by each of said horizontal frame members at one end thereof to provide a horizontally spaced apart pair of upright frame members having spacing therebetween corresponding to spacing between upright frame members of said carry-through frame, a tank saddle mounted upon and secured to each said tank-carrying frame for seating one of said tanks within said saddle, and means for providing initial interengagement of each said tank-carrying frame with said carry-through frame by downward movement, relative to said carry-through frame, of the end of each said tank-carrying frame by which connection is made to said carry-through frame, to provide pivotal interengagement of said carry-through frame with each said tank-carrying frame by defining a transverse pivot axis proximate a corresponding tractor frame member, said upright members of each of said carry-through and tank-carrying frames including a plurality of securement apertures aligning upon rotation of said tank-carrying frame upon said transverse pivot axis to permit rigid interconnection of said carry-through and tank-carrying frames by securement means received through the aligned apertures, whereby one end of each said tank-carrying frame initially may be rapidly and easily pivotally interengaged with said carry-through frame and subsequently the other end of each said tank-carrying frame may be raised to permit rigid, secure interengagement of each said tank-carrying frame with said carry-through frame.

2. An apparatus according to claim 1 and further characterized by said means for providing initial interengagement comprising brackets of said carry-through frame at opposite ends thereof, each said bracket presenting a first plurality of stud-receiving apertures in upwardly opening orientation, and a plurality of downwardly projecting studs carried by each said tank-carrying frame for being received by corresponding ones of said stud-receiving apertures upon downward movement relative to said carry-through frame of the end of said tank-carrying frame by which connection is made to said carry-through frame.

3. Apparatus as defined in claim 1 and further characterized by an adaptor frame for adapting said tank-carrying frame to a three-point hitch of said tractor, whereby said tank-carrying frame, including a tank mounted thereon, can be carried by said three-point hitch at the rear of said tractor.

4. Apparatus as defined in claim 3 and further characterized by said tank-carrying frame comprising a pair of upright frame members at one end thereof, said adaptor frame comprising a lower horizontal frame member and upper horizontal frame member and a plurality of vertical frame members extending between horizontal frame members, said upright frame members of said tank-carrying frame being securable to the vertical frame members of said adaptor frame, said lower horizontal frame member providing at its opposite ends two points of attachment to said three-point hitch, a pair of said vertical frame members defining means for securement of the third point of said three-point hitch.

5. Apparatus according to claim 1 and further characterized by said saddle including at least one layer of elastomeric material interposed between said saddle and tank, said tank having a roughened surface providing sandpaper-like projections, said projections seating themselves in said elastomeric material for maintaining said tank within said saddle securely against forces tending to cause shifting of said tank with respect to said saddle.

6. Apparatus according to claim 1 and further characterized by said side frame members each carrying a landing gear leg secured thereto for movement between extended and retracted positions, each said leg including at its securement-remote end a dolly wheel for ground engagement, whereby said dolly wheels provide ground support for said tank-carrying frame when said legs are extended, and a further leg usable in conjunction with said landing gear legs for providing stable ground support for said tank-carrying frame when the latter is unsecured to said carry-through frame.

7. Apparatus according to claim 6 and further characterized by said landing gear legs being located for supporting said tank-carrying frame at a point between the center of gravity of said tank unit and one end of said frame configured for securement to said carry-through frame.

8. Apparatus according to claim 7 and further characterized by said further leg constituting a removable jack leg secured to said tank-carrying frame at the opposite end thereof and extending downwardly therefrom.

9. Apparatus according to claim 8 and further characterized by said jack leg being selectively adjustable in length, and handle means extending outwardly from said tank unit at the end of said tank-carrying frame from which said jack leg extends downwardly, said handle providing for convenient positioning of said tank unit by rolling upon said dolly wheels proximate the respective side of said tractor for securement to or removal from said tractor.

10. Apparatus for fast hitch tractor-side mounting of spray tanks or the like at opposite sides of an agricultural tractor, said apparatus comprising a carry-through frame of truss configuration including means for securement of said carry-through frame beneath said tractor to frame members thereof, said carry-through frame being configured for supporting the weight of filled tanks on opposite sides of tractor and transferring said weight to said tractor frame, said carry-through frame providing opposite ends each including a pair of horizontally spaced apart upright frame members, a tank-carrying frame for carrying at least one of said tanks, each said tank-carrying frame being of rectangular configuration including a pair of spaced horizontal frame members and at least one upright frame member carried by each of said horizontal frame members to provide a horizontally spaced apart pair of upright frame members having spacing therebetween corresponding to spacing between upright frame members of said carry-through frame, a tank saddle mounted upon and secured to said tank-carrying frame members, and a spray tank seated within said saddle, means carried by said tank-carrying frame for initial pivotal interengagement of said tank-carrying frame, with said carry-through frame, means for subsequent rigid securement of said tank-mounting frame to said carry-through frame, each of said horizontal frame members carrying a landing gear leg including a dolly wheel at one end thereof, thereby to provide a pair of landing gear legs and dolly wheels for supporting the weight of said tank-carrying frame, saddle, and tank seated thereon, said landing gear legs being located closer to the end of said tank-carrying frame at which are carried said vertical frame members than to the opposite end of said tank-carrying frame, and a jack leg at said opposite end of said tank-carrying frame for jacking said opposite end selectively up or down for orienting said tank-carrying frame to a position for pivotal engagement of the upright frame members thereof with corresponding upright frame members of said carry-through frame, said landing gear legs and dolly wheels and jack stand all providing a support for said tank, saddle, and tank-carrying frame when unsecured to said carry-through frame.

11. Apparatus as defined in claim 10 and further characterized by handle means extending from the opposite end of said tank-carrying frame for wheelbarrow-like handling of the tank, saddle, and tank-carrying frame.

12. An apparatus for fast hitch tractor-side mounting of spray tanks or the like at opposite sides of an agricultural tractor, said apparatus comprising a carry-through frame of truss configuration including means for securement of said carry-through frame beneath said tractor to frame members thereof, said carry-through frame being configured for supporting the weight of filled tanks on opposite sides of said tractor and transferring the weight of said tanks to said tractor frame members, said carry-through frame providing opposite ends proximate said tractor frame members, said opposite ends each including securement members for providing points of securement for corresponding tank-carrying frames on opposite sides of said tractor, said points of securement being immediately proximate corresponding ones of said tractor frame members, each said tank-carrying frame being adapted for carrying at least one of said tanks and including main frame members and securement members carried by said main frame members at one end thereof to provide mating with the securement members of said carry-through frame, a tank saddle mounted upon and secured to each said tank-carrying frame for seating said at least one of said tanks within said saddle, and cooperative engagement means for providing initial interengagement of said tank-carrying frame with said carry-through frame by downward engaging movement, relative to said carry-through frame, of the end of each said tank-carrying frame carrying said securement members, to provide pivotal interengagement of said carry-through frame with each said tank-carrying frame by defining a transverse pivot axis proximate a corresponding tractor frame member, said securement members of each of said carry-through and tank-carrying frames including a plurality of securement apertures aligning upon rotation of said tank-carrying frame upon said transverse pivot axis to permit rigid interconnection of said carry-through and tank-carrying frames by securement means received through the aligned apertures, whereby one end of said tank-carrying frames initially may be rapidly and easily pivotally interengaged with said carry-through frame and subsequently the other end of each said tank-carrying frame may be raised to permit rigid, secure interengagement of each said tank-carrying frame with said carry-through frame.

13. An apparatus according to claim 12 and further characterized by said cooperative engagement means comprising complementary structure mutually carried by each of said tank-carrying frames and said carry-through frames, including a plurality of studs and stud-receiving apertures, said apertures receiving said studs for drop-in initial interengagement of each tank-carrying frame with said carry-through frame.

* * * * *